(12) United States Patent
Maesse

(10) Patent No.: US 8,505,280 B2
(45) Date of Patent: Aug. 13, 2013

(54) PROCESS FOR CONTROLLING THE INJECTION OF UREA IN A SELECTIVE CATALYTIC REDUCTION SYSTEM

(75) Inventor: Pierre Henri Maesse, Rueil Malmaison (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 413 days.

(21) Appl. No.: 12/739,114

(22) PCT Filed: Oct. 13, 2008

(86) PCT No.: PCT/FR2008/051851
§ 371 (c)(1),
(2), (4) Date: Apr. 21, 2010

(87) PCT Pub. No.: WO2009/053638
PCT Pub. Date: Apr. 30, 2009

(65) Prior Publication Data
US 2010/0300076 A1 Dec. 2, 2010

(30) Foreign Application Priority Data
Oct. 23, 2007 (FR) .................................. 07 58531

(51) Int. Cl.
*F01N 3/00* (2006.01)
(52) U.S. Cl.
USPC .................... 60/286; 60/295; 60/300; 60/301
(58) Field of Classification Search
USPC ............................ 60/274, 285–287, 295–301
See application file for complete search history.

(56) References Cited

U.S. PATENT DOCUMENTS

| | | | | |
|---|---|---|---|---|
| 5,628,186 | A | * | 5/1997 | Schmelz ........................ 60/274 |
| 6,074,619 | A | * | 6/2000 | Schoubye .................. 423/239.1 |

(Continued)

FOREIGN PATENT DOCUMENTS

| | | |
|---|---|---|
| EP | 1431533 A2 | 6/2004 |
| EP | 1602403 A2 | 12/2005 |

OTHER PUBLICATIONS

International Search Report corresponding to International Application No. PCT/FR2008/051851, mailed Jul. 1, 2009.

*Primary Examiner* — Thomas Denion
*Assistant Examiner* — Jesse Bogue
(74) *Attorney, Agent, or Firm* — Polster Lieder Woodruff & Lucchesi, L.C.

(57) ABSTRACT

The invention relates to a process for controlling the injection of urea in a selective catalytic reduction, known as CR, system for treating nitrogen oxides, intended to be installed in the exhaust line (6) of a motor vehicle (1) engine (2), wherein the treatment comprises chemically reducing, in a catalyst (3), known as SCR catalyst, the nitrogen oxides by adding ammonia contained in urea, the process comprising the following steps: —the temperature of the gases in the exhaust line (6) of the engine (2), upstream of the SCR catalyst (3), is measured, —if the temperature measured is above a predetermined minimum value, called minimum injection temperature, an order is given to inject urea (5), —if the temperature measured is below the minimum injection temperature, the following substeps are carried out: —a mass of ammonia stored in the SCR catalyst (3) is determined, —the amount of ammonia required to obtain a nitrogen oxide conversion greater than a predetermined value is determined, if the mass of ammonia stored in the catalyst is below this required amount, an order is given to activate a method of heating the exhaust gases, and to inject urea into the system.

6 Claims, 3 Drawing Sheets

(56) References Cited

U.S. PATENT DOCUMENTS

| | | |
|---|---|---|
| 6,305,160 B1 | 10/2001 | Hammerle et al. |
| 6,993,900 B2 * | 2/2006 | Upadhyay et al. ............. 60/286 |
| 7,707,824 B2 * | 5/2010 | Solbrig ........................ 60/286 |
| 2003/0036841 A1 * | 2/2003 | Xu et al. ....................... 701/102 |
| 2007/0125077 A1 * | 6/2007 | Wegst et al. ................... 60/299 |
| 2007/0175208 A1 * | 8/2007 | Bandl-Konrad et al. ....... 60/286 |
| 2008/0066456 A1 * | 3/2008 | Schmieg et al. ............... 60/286 |
| 2009/0260346 A1 * | 10/2009 | Gekas et al. ................... 60/274 |

\* cited by examiner

PROCESS FOR CONTROLLING THE INJECTION OF UREA IN A SELECTIVE CATALYTIC REDUCTION SYSTEM

CROSS-REFERENCE TO RELATED APPLICATIONS

The present application is the US national stage under 35 U.S.C. §371 of International Application No. PCT/FR2008/051851 which claims the priority of French application 0758531 filed on Oct. 23, 2007.

BACKGROUND

The present invention is situated in the domain of exhaust gas treatment systems installed in automotive vehicles. More precisely, the invention relates to a process for controlling the injection of urea in such a system, in order to optimize the operation of the treatment system. The process described here finds a particularly advantageous, but non-limiting, application in catalytic systems for selective catalytic reduction, called SCR, of nitrogen oxides emitted by an engine.

The principle of a SCR treatment system consists in chemically reducing the nitrogen oxides NOx by adding a reducing agent, such as ammonia ($NH_3$) contained in urea or in any other reducing agent, for instance AdBlue, or DeNOXIUM, or C-Blue, upstream of a specific catalyst, called SCR catalyst. Such a system allows vehicles, in particular those equipped with diesel engines, to meet the legally permitted emission levels, which are continuously lowered.

Examples of nitrogen oxides are nitrogen monoxide, nitrogen dioxide, or any other chemical compound containing nitrogen and oxygen molecules.

In such a system, the urea injected in the exhaust line is converted to ammonia, in two successive chemical reactions:

first a pyrolysis reaction $(NH_2)_2CO \rightarrow HNCO+NH_3$, and then a hydrolysis reaction $HNCO+H_2O \rightarrow CO_2+NH_3$.

The ammonia thus obtained reacts in the SCR catalyst with the nitrogen oxides emitted by the engine. Depending on the composition of the exhaust flow, one or more of the following reactions can take place in the catalyst:

a so-called standard SCR reaction, reducing the nitrogen monoxides:  $4NH_3+4NO+O_2 \rightarrow 4N_2+6H_2O$, a so-called "fast SCR" reaction, reducing the nitrogen monoxides and the nitrogen dioxides: $4NH_3+2NO+2NO_2 \rightarrow 4N_2+6H_2O$. This reaction is certainly faster than the standard reaction, but requires equivalent quantities of nitrogen monoxide and nitrogen dioxide, and a reducing reaction of nitrogen dioxide only, less fast than the previous reactions: $8NH_3+6NO_2 \rightarrow 7N_2+12H_2O$ Given the conditions imposed by these chemical reactions, one of the main prerequisites for proper functioning of a selective catalytic reaction resides in the temperature of the exhaust gases. Indeed, this temperature must be sufficiently high:

at the urea injector, for proper decomposition of urea in ammonia, and at the SCR catalyst, for proper catalysis of the nitrogen oxides.

In the current state of technology there are numerous systems for treating nitrogen oxides using ammonia contained in liquid urea.

Such systems employ, for instance, urea injection strategies in which urea is injected only when the temperature in the exhaust line is greater than a predetermined value. Although effective during long distance driving, or in vehicles such as trucks, these systems, prove sometimes to be less efficient when installed in light vehicles driving in urban environment. Indeed, in these driving conditions, the temperature of the exhaust gas remains relatively low, because of the low speed and the frequent stops of the vehicle. Consequently, the injection of reducing agents is sometimes insufficient for correct treatment of the nitrogen oxides emitted by the engine.

In general, SCR catalysts used in treatment systems are built so that they can adsorb ammonia. When the temperature conditions do not allow the injection of urea, in numerous known systems it is possible to use the ammonia stored in the catalyst in order to start the chemical reactions for reduction of nitrogen oxide.

However, in such systems, it is difficult to control the quantity of ammonia stored in the catalyst. In this case, the catalyst is sometimes saturated with ammonia, which can lead to discharge of ammonia gas into the atmosphere. Since ammonia is an ill-smelling and irritating gas, such gas discharge is bothersome for the users of the vehicle.

Certain systems were also designed to heat the exhaust gases, continuously or during start-up, in order to ensure a sufficiently high temperature at all times. Nevertheless, these systems have in general the same previously described inconvenience, namely the inconvenience of regularly producing ammonia discharges into the atmosphere. Furthermore, the employed heating methods are energy intensive, which leads to relatively high consumption in the engine.

BRIEF SUMMARY

The goal of the present invention is to remedy these inconveniences, partially or completely, by proposing a strategy for controlling the injection of urea coupled to a heating device for the exhaust gas, in order to ensure optimum treatment of the nitrogen oxides while limiting the overconsumption of fuel in the vehicle.

The invention relates to a process for controlling the injection of urea in a nitrogen oxide treatment system with selective catalytic reduction, called SCR, designed to be installed in the exhaust line of the engine of an automotive vehicle. The treatment involves the chemical reduction of nitrogen oxides, in a catalyst, called SCR catalyst, by adding ammonia contained in the urea. The process comprises the following steps:

measuring the temperature of the gases in the exhaust line of the engine, upstream of the SCR catalyst, commanding injection of urea if the measured temperature is greater than a predetermined minimum value, called minimum injection temperature, initiating the following sub-steps if the measured temperature is lower than the minimum injection temperature:

determining the mass of ammonia stored in the SCR catalyst, determining the quantity of ammonia necessary for obtaining a conversion of nitrogen oxides greater than a predetermined value, if the mass of ammonia stored in the catalyst is smaller than this necessary quantity, a command is issued to activate the exhaust gas heating mode and the injection of urea in the system.

In the following description, the terms "hot phase" and "cold phase" will be used to designate operating phases of the vehicle defined as a function of the temperature of the gases in the exhaust line.

A SCR catalyst has ammonia storing capacity. It is therefore possible to implement a reducing agent injection principle that involves injecting the reducing agent during the hot phases, in order to ensure, on the one hand, the reduction of nitrogen oxides by reaction with ammonia, and on the other hand, the storage of ammonia in the catalyst.

This injection of reducing agent in the hot phase takes place thanks to the first stage of the process, during which the temperature of the gases in the exhaust line is measured, in order to determine whether the system is in hot phase or cold phase.

It was observed that the chemical reactions taking place in a selective catalytic reduction process require a gas temperature greater than 180° C. in order to be carried out in good conditions. Therefore, a hot phase will be defined, for instance, as a phase during which the gas temperature is greater than this value of 180° C.

In an advantageous implementation mode of the invention, the minimum injection temperature is established at 180° C.

According to the same principle, the urea injection is stopped during the cold phases and the ammonia stored in the SCR catalyst is used for reduction of the nitrogen oxides. A cold phase corresponds, for instance, to an idling phase of the vehicle.

However, sometimes the quantity of ammonia stored is not sufficient for proper conversion of nitrogen oxides during the whole cold phase, and therefore for obtaining the conversion rate desired by the manufacturers or the users of the vehicle. One of the goals of the invention is to optimize the conversion of nitrogen oxides emitted by the engine, in order to meet the existing standards. When the quantity of stored ammonia is insufficient, it is therefore necessary to proceed with injection outside the hot phases. For this purpose, the process is designed so that a heating mode is activated, in order to increase the gas temperature and to create the proper reaction conditions.

The decision to activate the heating mode, is therefore made as a function of a desired conversion efficiency. The parameters used to decide this activation will be detailed later based on figures.

Another goal of the invention is to provide a process for controlling the injection of urea which limits the overconsumption of the vehicle. Thus, in an advantageous implementation form, it is useful to limit the activation time of the heating mode to the minimum necessary.

For this purpose, the invention involves, in one execution form, a process comprising the following stages:
  determining a maximum quantity of ammonia that can be stored in the SCR catalyst,
  continuously measuring the quantity of ammonia stored in the catalyst, and
  if the exhaust gas heating mode is activated when the stored quantity reaches the maximum quantity, commanding the deactivation of this heating mode.

The maximum quantity of ammonia is determined, for instance, as a function of a relationship between the conversion efficiency and the mass of ammonia present in the catalyst. The maximum quantity of ammonia can also correspond with the saturation quantity of the catalyst, in other words a quantity which when exceeded results in desorption of the stored ammonia. This quantity depends, for instance, of the size and the type of SCR catalyst used.

In a variant of this implementation mode, the measuring stage of the ammonia quantity is replaced by a modeling stage, based on predetermined information, of this ammonia quantity, as a function of vehicle operating parameters.

In order to reduce the fuel consumption even more, another advantageous implementation form uses a thermal inertia model of the exhaust line to anticipate the end of the heating mode, while continuing to inject reducing agent. Indeed, the inertia model determines the time from which the mass of reducing agent stored in the catalyst and the temperature of the gases are sufficiently high, after deactivation of the heating mode, in order for the temperature to remain greater than the minimum injection temperature, during a sufficiently long time to reach the maximum quantity of ammonia.

In one implementation mode of the invention, the stage in which the activation and/or deactivation of the heating mode is commanded comprises the modification of at least one engine parameter influencing the temperature of the exhaust gases.

The engine parameter is, for instance, the circulation rate of the exhaust gases or a fuel injection phase, or a quantity of injected fuel.

Thus, in one example, the activation of the heating mode involves the recalibration of the parameter reflecting the phasing of injection and air loop. In fact, it was observed that, by setting the main injection of urea too low, and by augmenting the flow of exhaust gases which is re-injected in the cylinders of the engine, the temperature of the exhaust gases increases.

In another example, the activation of the heating mode involves using an injector for injecting in the exhaust line a quantity of fuel greater than the quantity necessary for proper functioning of the engine. In this case, a part of the additional quantity of fuel ignites during the injection in the exhaust line, provoking an increase in exhaust gases.

BRIEF DESCRIPTION OF THE DRAWINGS

Other advantages and characteristics of the invention will become clear with the description of certain implementation modes. This description is provided as a non limiting example by means of figures in which.

DETAILED DESCRIPTION

Figure 1:
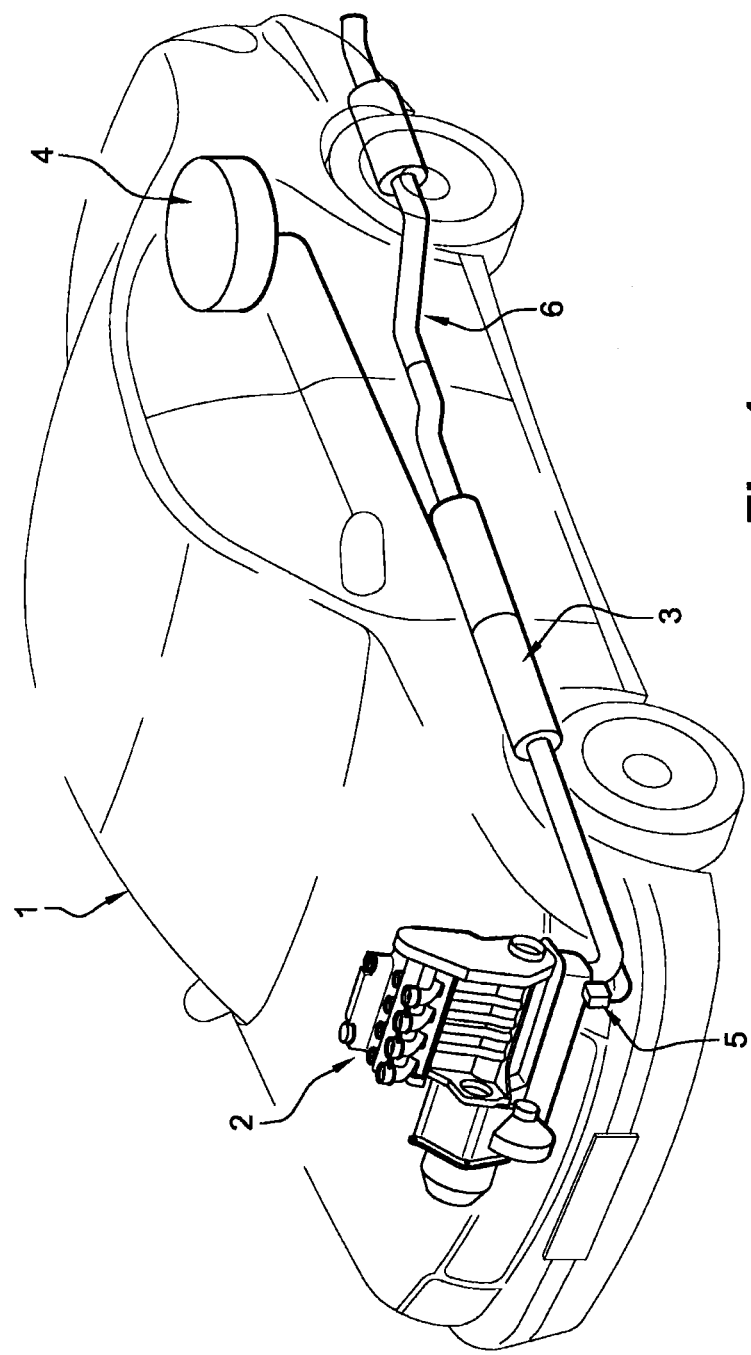
FIG. 1 shows a diesel vehicle in which a process according to the invention is employed.

A process according to the invention is particularly adapted for use in a light automotive vehicle, such as vehicle 1 shown in FIG. 1. For the implementation of such process, vehicle 1 is equipped with a system for treatment of exhaust gases emitted by engine 2. This treatment is carried out by selective catalytic reduction in a catalyst 3, called SCR catalyst, situated in the exhaust line 6.

According to the execution forms, the SCR catalyst can be placed upstream or downstream of the particulate filter installed in the exhaust line.

The treatment involves the reduction of nitrogen oxides by a reducing agent, for instance ammonia contained in urea. This reducing agent is stored in a reservoir 4, for instance situated in the rear of the vehicle. During the process, the reducing agent is injected through the intermediary of an injector 5 situated upstream of catalyst 3 in the exhaust line 6.

Furthermore, it is necessary that vehicle 1 has an electronic processor for controlling the SCR system. This processor is not shown in FIG. 1. The processor can be specifically dedicated to the process, or part of an engine control module already present in the vehicle.

As mentioned previously, some existing SCR systems are controlled by a process that does not ensure sufficient storage of reducing agent to treat all nitrogen oxides. Such situation is illustrated by means of FIGS. 2a and 2b, which show the evolution of different engine parameters in a vehicle equipped with a SCR system controlled by a classic urea injection process.

Figure 2A:
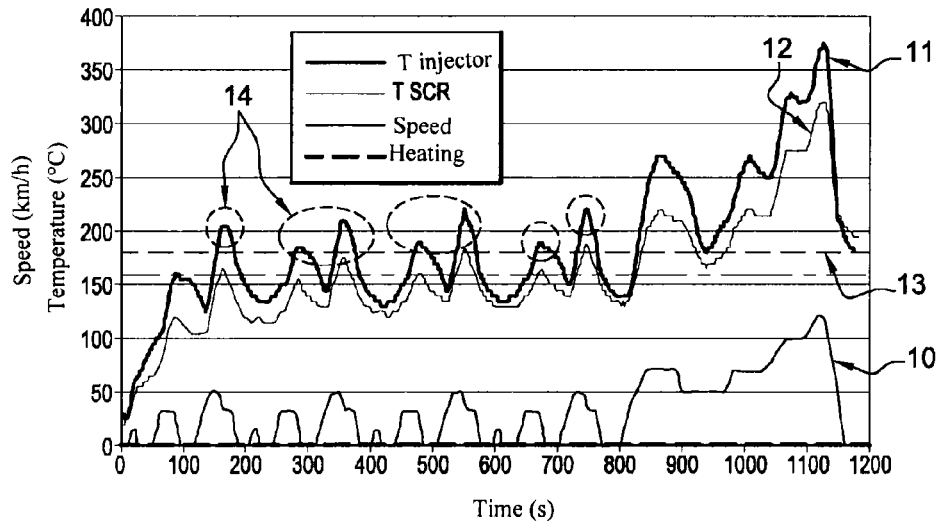
FIGS. 2a and 2b show the evolution of certain engine parameters during one operating cycle type NEDC, in a vehicle that does not employ the process according to the invention.

The graph represented in FIG. 2a shows the evolution of the exhaust temperature of an engine submitted to a normalized operation cycle, type NEDC (New European Driving Cycle). This operation cycle includes 4 urban operation cycles, called ECE cycles or UDC cycles (Urban Driving Cycle), and an extra-urban driving cycle, called EUDC cycle (Extra-Urban Driving Cycle).

Several parameters are represented in this figure:
curve 10 shows the evolution of the vehicle speed during the operating cycle,
curve 11 shows the temperature at the nose of the reducing agent injector, installed in the exhaust line,
curve 12 shows the temperature in the SCR catalyst.

As previously described, in a SCR treatment system the chemical reactions can only occur correctly above a certain temperature.

Thus, the decomposition reactions of urea in ammonia can only occur when a certain temperature is exceeded at the nose of the injector; on the other hand, the reduction reactions can only take place when a certain temperature is exceeded in the SCR catalyst.

Consequently, the injection of urea must only take place, in the first place, when the minimum required temperature is exceeded at the nose of the injector; failure to do so would render the injection useless. This minimum injection temperature, generally 180° C., is illustrated by the horizontal dashed line 13.

It is observed when looking at curve 11 of the evolution of the temperature, in a NEDC operating cycle, that between the start and the $450^{th}$ second, the reducing agent can only be injected on two occasions. These two occurrences correspond with the times in which curve 11 crosses line 13, evidenced by circles 14 in FIG. 2a.

It would be beneficial to inject the reducing agent earlier in the cycle, as soon as a significant quantity of nitrogen oxide appears.

Figure 2B:
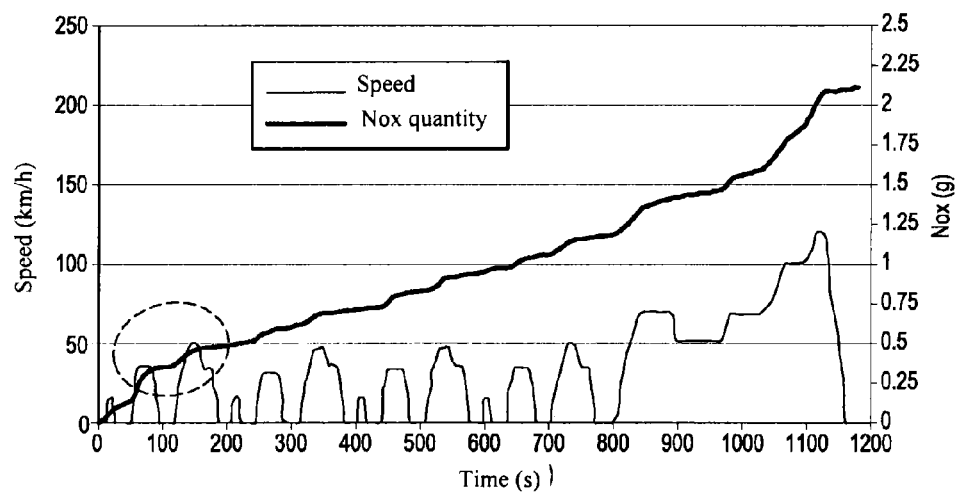

The evolution of this quantity of nitrogen oxide emitted during the operating cycle is illustrated in FIG. 2b. It can be seen that, from the $50^{th}$ second of the cycle, the quantity of emitted oxides exceeds 0.25 grams, which represents a non negligible value. Consequently, it would be useful to start reducing the nitrogen oxides from this moment.

Furthermore, the NEDC cycle is designed so that it contains numerous decelerations, during which the temperature in the exhaust line diminishes significantly.

Consequently, the injection of the reducing agent in the four urban cycles of the NEDC cycle risks of being insufficient to treat correctly all the oxides emitted by the engine.

The process aims therefore at remedying this inconvenience by activating a heating mode to ensure the vaporization and the decomposition of the reducing agent, in order to proceed with more frequent injections.

Figure 3:
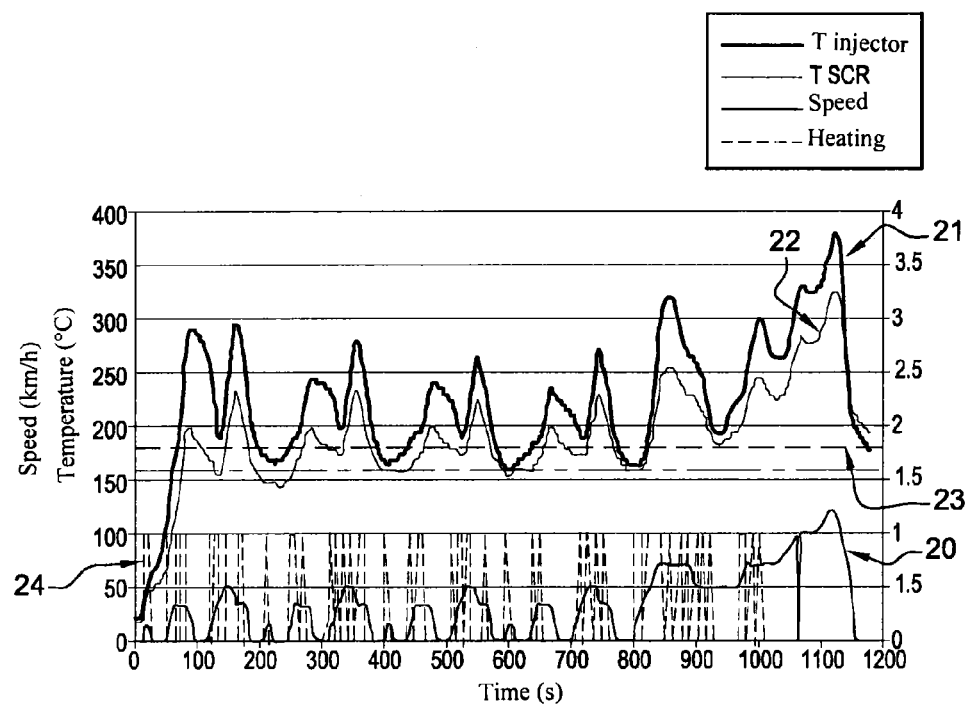
FIG. 3 shows the evolution of engine parameters in case that a process according to the invention is employed.

FIG. 3 illustrates the evolution of the engine parameters in a vehicle with a SCR system controlled by a process according to the invention.

In this figure, the curves show the evolution of the engine parameters, in similar manner to FIG. 2a, namely:
curve 20 shows the evolution of the vehicle speed during the operating cycle,
curve 21 shows the temperature at the nose of the reducing agent injector, installed in the exhaust line,
curve 22 shows the temperature in the SCR catalyst, and
curve 23 represents the minimum injection temperature.

The dotted line 24 shows the activation and deactivation of the heating mode: when the line is at value 1, this means that the heating is activated.

It is then observed in this FIG. 3 that the temperature at the injector nose increases significantly from the beginning of the operating cycle, and exceeds the minimum injection temperature of the reducer after the $50^{th}$ second.

However, in a process according to the invention, the activation of the heating mode does not depend uniquely of the gas temperature, since the goal of the invention is also to limit the overconsumption by activating the heating only when it is really necessary.

SCR catalysts used in general in SCR treatment systems are capable of storing ammonia. The stored ammonia can be used to reduce the nitrogen oxides, even if no reducing agent is injected.

To optimize the conversion of oxides while limiting the consumption, the process is designed to activate the heating mode only when the stored ammonia quantity does not guarantee a predetermined conversion efficiency.

Figure 4:
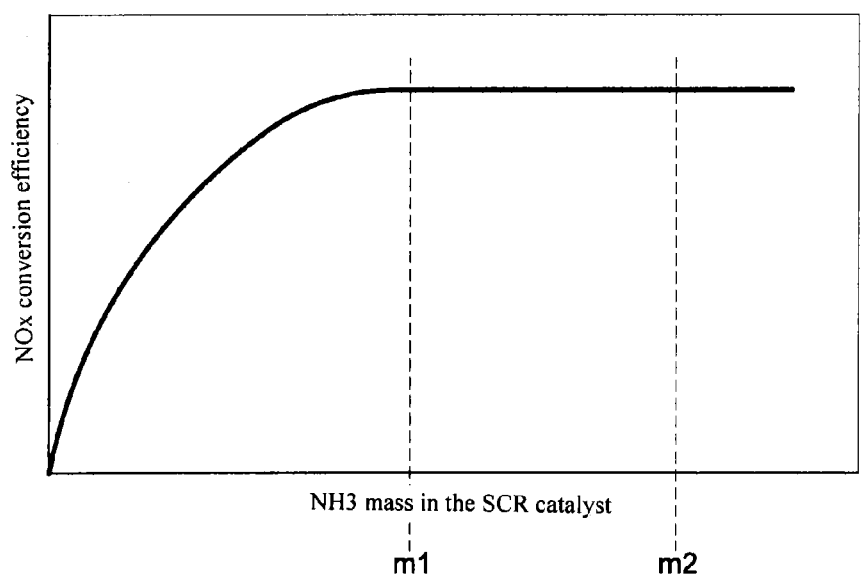
FIG. 4 shows a variation of the conversion efficiency of nitrogen oxides in a SCR catalyst, as a function of the ammonia mass stored in the catalyst.

The mass of ammonia that ensures this efficiency is determined by means of a predetermined graph of the evolution of the conversion efficiency of oxides as a function of the mass, such as shown in FIG. 4.

The curve of FIG. 4 shows this evolution, and is used to determine the necessary minimum mass $m_1$ for obtaining the efficiency that is generally desired in a vehicle engine.

It is also possible to determine a maximum storage capacity $m_2$, above which desorption of ammonia in the atmosphere takes place, which is relatively inconvenient for the users of the vehicle.

In a particularly advantageous execution form of the invention, when the temperature conditions necessary for the injection of urea are not fulfilled, the heating mode is activated when the ammonia mass stored in the catalyst is less than $m_1$. This heating mode is subsequently deactivated when the mass exceeds $m_2$.

Furthermore, as previously mentioned, it is possible to limit the consumption of fuel by using a thermal injection model for anticipating the stop of the heating mode.

In the execution form illustrated by FIG. 3, the heating mode is not activated to the maximum, in order to retain a correct conversion/consumption compromise.

Notwithstanding the activation of the heating mode, it is evident that the temperature of the gas sometimes remains lower than the minimum injection temperature, in particular during idling. In this case, only the ammonia stored in the catalyst is used for reduction of nitrogen oxides.

Therefore, the invention distinctly improves the conversion efficiency of nitrogen oxides in a NEDC cycle, without modifying parts of the vehicle; in fact, the activation and deactivation of the heating mode involve a different adjustment of some engine parameters, and it is therefore not necessary to modify the structure of the vehicle or of the SCR system in order to implement this invention.

Furthermore, this process delivers this improvement without increasing the consumption significantly, ensuring in this way a good compromise between the conversion of oxides and the consumption generated by the implementation of the process.

The invention claimed is:
1. A process for controlling the injection of urea for treatment of nitrogen oxides in a selective catalytic reduction system (SCR) intended to be installed in an exhaust line of an engine of an automotive vehicle, the treatment comprises chemically reducing in an SCR catalyst, nitrogen oxides by adding ammonia contained in urea; the process comprising the following steps:

(a) first measuring of the temperature of the gases in the exhaust line of the engine, upstream of the SCR catalyst, then, after measuring the temperature of the gases:

(b) injecting urea into the exhaust line if the measured temperature is greater than a predetermined minimum injection temperature, (c) performing steps (c)(i)-(c)(v) if the measured temperature is lower than the minimum injection temperature:

(i) determining the quantity of ammonia (Qs) stored in the SCR catalyst, (ii) determining a nitrogen oxide conversion efficiency;

(iii) determining the quantity of ammonia (Qn) necessary for obtaining a conversion of nitrogen oxides greater than said conversion efficiency, (iv) comparing the quantity of ammonia (Qs) stored in the SCR catalyst with the quantity of ammonia (Qn) determined in step (c)(iii) necessary for obtaining the conversion of nitrogen oxides greater than said conversion efficiency; and (v) activating a heating mode of the exhaust gases and injecting urea into the system if the quantity of ammonia (Qs) stored in the catalyst is less than the quantity of ammonia (Qn) necessary to obtain the conversion of nitrogen oxides greater than said conversion efficiency.

2. The process according to claim 1, in which the minimum injection temperature is set at 180° C.

3. The process according to claim 2 further comprising the following steps:

determining the maximum quantity of ammonia that can be stored in the SCR catalyst, continuously measuring the quantity of ammonia stored in the catalyst, and if the exhaust gas heating mode is activated when the stored quantity reaches the maximum quantity, deactivating the heating mode.

4. The process according to claim 3, in which the maximum quantity of ammonia corresponds with a quantity above which desorption of ammonia takes place.

5. The process according to claim 3, in which the step of commanding activating and/or deactivating the heating mode comprises modifying at least one engine parameter having an influence on the temperature of the exhaust gases.

6. The process according to claim 5, in which the engine parameter is a circulation rate of the exhaust gases, a fuel injection phase or a quantity of injected fuel.

\* \* \* \* \*